United States Patent
Furman et al.

(10) Patent No.: US 11,563,733 B2
(45) Date of Patent: Jan. 24, 2023

(54) SECURITY TOKEN VALIDATION USING PARTIAL POLICY VALIDATIONS

(71) Applicant: MICROSOFT TECHNOLOGY LICENSING, LLC., Redmond, WA (US)

(72) Inventors: Maria Furman, Redmond, WA (US); Dorde Krecar, Bellevue, WA (US); Amit Ranjan Kumar, Redmond, WA (US); Douglas Brent Schmaltz, Redmond, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 226 days.

(21) Appl. No.: 16/802,492

(22) Filed: Feb. 26, 2020

(65) Prior Publication Data
US 2021/0266306 A1    Aug. 26, 2021

(51) Int. Cl.
H04L 9/40       (2022.01)
G06F 16/955     (2019.01)
H04L 9/32       (2006.01)

(52) U.S. Cl.
CPC ........ H04L 63/083 (2013.01); G06F 16/9566 (2019.01); H04L 9/3247 (2013.01); H04L 63/20 (2013.01)

(58) Field of Classification Search
CPC ................. H04L 63/083; H04L 9/3247; G06F 16/9566

USPC .......................................................... 726/1
See application file for complete search history.

(56) References Cited

U.S. PATENT DOCUMENTS

| | | | |
|---|---|---|---|
| 7,774,830 B2 | 8/2010 | Dillaway et al. | |
| 9,444,848 B2 | 9/2016 | Green et al. | |
| 10,404,716 B2 | 9/2019 | Walstad et al. | |
| 10,498,734 B2 | 12/2019 | Erb | |
| 2012/0303491 A1* | 11/2012 | Hill | G06Q 30/06 |
| | | | 705/27.2 |
| 2013/0179244 A1 | 7/2013 | Laffoon et al. | |
| 2013/0346606 A1* | 12/2013 | Ryerson | H04L 63/101 |
| | | | 709/225 |
| 2017/0134429 A1* | 5/2017 | Gustafsson | H04L 9/3268 |
| 2019/0098055 A1 | 3/2019 | Pitre et al. | |
| 2019/0149579 A1 | 5/2019 | Kakumani et al. | |

OTHER PUBLICATIONS

"International Search Report and Written Opinion Issued in PCT Application No. PCT/US21/014420", dated May 3, 2021, 10 Pages.

(Continued)

*Primary Examiner* — Anthony D Brown

(57) ABSTRACT

A policy engine validates one or more security tokens in an authenticated request using a sequence of partial policy validations. Multiple policies may be applied to the security token using the work product generated from each failed policy. The policy that succeeds in validating the security token has a portion of its work performed through previously-failed policies that did not complete successfully. In this manner, the validation of a policy is performed faster and more efficiently since the previous processing is not repeated whenever a new policy is applied.

20 Claims, 5 Drawing Sheets

(56) References Cited

OTHER PUBLICATIONS

"Manually validating a JWT using .NET", Retrieved from: https://www.jerriepelser.com/blog/manually-validating-rs256-jwt-dotnet/, Apr. 10, 2017, 3 Pages.

Hoang, Bac, "Understanding Azure Ad's On-Behalf-Of Flow (Aka Obo Flow)", Retrieved from: https://blogs.aaddevsup.xyz/2019/08/understanding-azure-ads-on-behalf-of-flow-aka-obo-flow/, Aug. 04, 2019, 15 Pages.

Indu, et al., "Identity and Access Management in Cloud Environment: Mechanisms and Challenges", In Journal of Engineering Science and Technology, an International Journal, vol. 21, Issue 4, Aug. 2018, pp. 574-588.

Lock, Andrew, "A Look Behind the JWT Bearer Authentication Middleware in ASP.NET Core", Retrieved from: https://andrewlock.net/a-look-behind-the-jwt-bearer-authentication-middleware-in-asp-net-core/, Aug. 23, 2016, 11 Pages.

Zawadzki, Michal, "User Authentication in ASP.NRY WRB API 2 with RSA-signed JWT Tokens (part 1)", Retrieved from: https://zaven.co/blog/user-authentication-asp-net-web-api-jwt-tokens/, Sep. 22, 2016, 12 Pages.

\* cited by examiner

SECURITY TOKEN VALIDATION USING PARTIAL POLICY VALIDATIONS

BACKGROUND

The proliferation of the Internet has changed the workplace. An organization's Information Technology (IT) resources may be hosted on a cloud-based system which enables access from any location, from different types of applications (e.g., web-based application, mobile application, desktop application) and from different types of devices (e.g., mobile, Internet of Things (IoT), desktop, laptop, etc.). The integration of applications and services outside of an organization's domain led to the use of third-party identity providers to control access to a secured resource. An identity provider authenticates a user or application seeking access to a secured resource. Upon successful authentication, a security ticket or token is provided to the user/application representing authentication of the identity of the user.

Different identity providers may be used to authenticate the user/application seeking access to a particular resource. Each identity provider may use a different authentication/authorization protocol to create the security token thereby increasing the complexity of the processing needed to validate the security token in an authenticated request.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A policy engine validates security tokens in an authenticated request before releasing access to the secured resource in accordance with a policy set forth by the owner or administrator of the secured resource. A policy sets forth the requirements that the security token has to adhere to in order for a cloud service to trust the request. The security token represents a trust between the identity provider, the user/application seeking access to the resource, and the target service hosting the secured resource. Different identity providers utilize different authentication protocols having different levels of security and trust. There may be different policies for a resource based on the particular identity provider that generated the security token.

The validation of a security token is a consuming task requiring a considerable amount of resources and computing time. In order to improve the processing time and resource consumption incurred in the validation process, a sequence of partial policy validations is used. A security token needs to conform to at least one policy. Often, there are common functions in the different policies. The policy engine is able to validate a security token using the rules of the different policies due to the overlapping functions that are commonly found in a policy. The work product generated from each failed policy is transferred to one or more succeeding policies in order to eliminate any redundant processing. The policy that succeeds in validating the security token may have a portion of its work performed through the partially-completed validations of the previously-executed policies. In this manner, the validation of a policy is performed faster and more efficiently since the previous processing is not repeated whenever a new policy is applied in the validation process.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1:
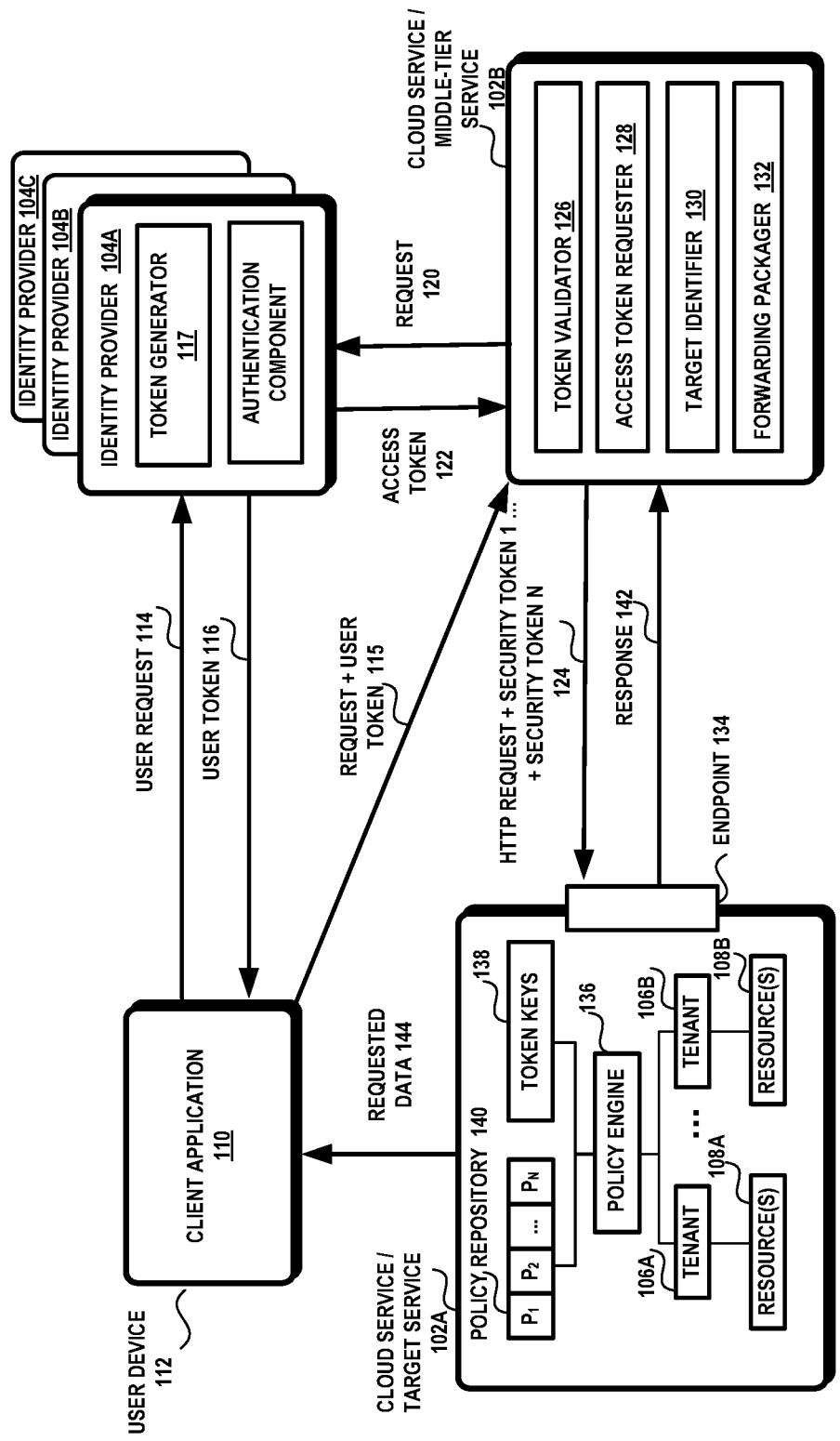
FIG. 1 illustrates an exemplary system for validating a security token using a sequence of partial policy validations.

Aspects of the present invention pertain to the validation of security tokens used in an authenticated request made to access a secured resource of a cloud-based computing system. The security token is generated by an identity provider that authenticates the identity of an application seeking access to a secured resource, such as a web Application Programming Interface (API). An identity provider controls access to the resources hosted in the cloud-based computing system including checking if the right person, process or application is allowed access to a requested resource.

A resource owner may allow several different identity providers to authenticate the credentials of the application seeking access to a resource. An identity provider utilizes an authentication protocol to authenticate the application's identity and upon successful authentication, a security ticket or token is issued. A security token represents a form of trust. In one aspect, the security token represents that the identity of the user or application has been authenticated from the perspective of the identity provider. The security token is passed onto the web service hosting the resource. A policy engine validates the security token before access to the resource is granted.

The security token represents a trust relationship for future interactions. The security token may be used instead of password credentials to prove an identity between a client application and a web service. The security token enables a web service to approve one application interacting with another application on the behalf of the requestor without disclosing the requestor's password credentials.

A security token contains claims that provide assertions about a requestor. The security token is typically a character string containing encoded information about an entity with a limited validation time period. The security token is validated by a policy that sets forth the requirements that need to be satisfied before access is granted to a resource. A policy is created by the owner or administrator of the resource. There may be different polices associated with a resource where each policy may contain different requirements due to the different authentication protocols used by different identity providers.

A policy engine validates the security tokens in an authenticated request before releasing access to the secured resource. The security token needs to conform to the rules of at least one policy and not to all the policies associated with a resource. Often, there are common functions that are used to validate a security token across different policies. The policy engine is able to validate a security token using rules of different policies due to the overlapping functions that are common amongst the policies. The work product generated from each failed policy is transferred to one or more succeeding policies in order to eliminate redundant processing. The policy that succeeds in validating the security token has a portion of its work performed through the partial policy validation of the previously-failed policies. In this manner, the validation of a policy is performed faster and more efficiently since the previous processing is not repeated whenever a new policy is applied.

Attention now turns to a discussion of the system, devices, components, and methods utilized in validating a security token used in an authenticated request.

System

FIG. 1 illustrates a block diagram of an exemplary cloud-based computing system 100 in which various aspects of the invention may be practiced. The system 100 may be configured with multiple cloud services 102A-102B ("102") communicatively coupled to one or more identity providers 104A-104C ("104"). A cloud service 102 is a service available on demand for users and applications through a publicly-accessible network, such as the Internet. A cloud service 102 hosts the resources 108A-108B ("108") of multiple tenants 106A-106B ("106") that are accessible over the Internet.

A tenant 106 is a directory that is associated with an enterprise, organization, group, user account or entity. A subscription is a logical entity that provides entitlement to access resources 108. A tenant 106 contains resources 108, such as virtual machines, applications, application programming interfaces (APIs), storage accounts, services, etc. that are grouped into a subscription. The cloud service 102 hosts the tenant's resources 108 and controls access to the resources 108. Examples of a cloud service 102 include without limitation, Microsoft Azure®, Google Cloud Platform™ service, iCloud®, and the like.

The cloud service 102 includes one or more cloud servers (not shown) that facilitate hosting the resources 108 of the tenants 106. A cloud server may be part of a datacenter that provides distributed computing services such as cloud computing services. A data center can provide pooled resources on which customers or tenants can dynamically provision and scale applications as needed without having to add servers or additional networking. The datacenter can be configured to communicate with local computing devices used by cloud consumers including personal computers, mobile devices, embedded systems, or other computing devices. Within the data center, computing devices can be configured as servers, either as standalone devices or individual blades in a rack of one or more other server devices. A tenant 106 may initially use one virtual machine on a server to run an application. The datacenter may activate additional virtual machines on a server or other servers when demand increases, and the datacenter may deactivate virtual machines as demand drops.

A datacenter may be an on-premises, private system that provides services to a single enterprise user or may be a publicly (or semi-publicly) accessible distributed system that provides services to multiple, possibly unrelated customers and tenants, or may be a combination of both. Further, a datacenter maybe contained within a single geographic location or may be distributed to multiple locations across the globe and provide redundancy and disaster recovery capabilities. For example, the datacenter may designate one virtual machine on a server as the primary location for a tenant's application and may activate another virtual machine on the same or another server as the secondary or back-up in case the first virtual machine or server fails.

An identity provider 104 helps users log onto and access the resources 108 of a tenant 106. An identity provider 104 creates, maintains, and manages identity information and authentication services to the hosted resources. An identity may be a federated identity which links a user's electronic identity and related attributes stored across various different identity providers. A federated identity allows a user or application to sign on to multiple services with a single login or sign on. The identity provider 104 implements federated identity using authentication protocols that support the exchange of authentication and/or authorization data between web-based services such as Security Assertion Markup Language (SAML), Open Authorization (OAuth), an identity layer on top of OAuth protocol such as OpenID Connect, and Web Services Federation (WS-Federation).

The components shown in FIG. 1 are representative of an exemplary On-Behalf-Of authentication flow utilizing the OAuth 2.0 authentication protocol. However, it should be noted that the disclosure is not limited to this particular authentication flow or authentication protocol.

The On-Behalf-Of authentication flow allows a client application, at a user's device, that invokes a web service/API, to pass user authentication to another service. Initially, the user authenticates with an identity provider 104 to obtain a token 116 that authenticates the user. A client application 110 at the user's device 112 uses the initial token 114 to request 115 that a middle-tier client service 102B perform the request 120 to access a web API that resides on or is associated with target cloud service 102A. The target cloud service 102A obtains an access token 122 from an identity provider 104 based on the authenticated identify information from the first token. The middle-tier client service 102B obtains the access token 122 from the identity provider 104 and the middle-tier client service 102B then forwards the authenticated request 124 to the target cloud service 102A.

As shown in FIG. 1, an identity provider 104 receives a request 114 to authenticate a user. The identity provider 104 issues a user token 116 that contains identifying information of the user. The user token 116 is digitally signed with the identity provider's signature and provided to the user's device 112. A client application 110, at the user's device 112, uses the user token 116 to request 115 another cloud service, such as a middle-tier service 102B, to obtain an access token for the resource on behalf of the client application 110.

The middle-tier cloud service 102B receives the request 115 and uses the token validator 126 to extract the user token and validate the signature. Upon successful validation, the middle-tier cloud service 102B uses an access token requestor 128 to request 120 an access token 122 on behalf of the client application 110 from the identity provider 104. Upon receipt of the access token 122, the middle-tier service 102B uses the target identifier 130 to determine the target service. The forwarding packager 132 generates an authenticated request to the target service 102A on behalf of the client application 110. The target service 102A validates the access token 122 in the authenticated request 124 against one or more policies before releasing the requested resource in a response 126 to the client application 110.

The authenticated request 124 is made to an endpoint 134 where a web API can access the resources needed to carry out its functions. The endpoint 134 supports a set of HTTP operations or methods, which create, retrieve, update or delete a resource of the cloud service 102A. The request 124 includes a Uniform Resource Identifier (URI) and a HTTP request message header. The URI indicates the protocol used to transmit the request (e.g., http, https), the domain name or Internet Protocol (IP) address of the server of the service endpoint, the resource path and parameters. The HTTP request message header includes a HTTP method (e.g., GET, HEAD, PUT, POST, and PATCH methods) that tells the service the type of operation that is being requested and includes the access token. The response 142 may include a HTTP response message header and a HTTP response message body. The HTTP response message header may include a status code and other optional data.

An endpoint 134 is a network port that is referenced by a uniform resource locator (URL) to receive messages destined to a particular cloud service and to transmit responses to the messages. There may be multiple endpoints for the cloud service where each endpoint is used to receive different types of messages. The target service 102A may include an endpoint 134 that receives authenticated requests to access a web API.

The target service 102A validates the authenticated request before releasing the requested data 144 to the client application 110. The target service 102A includes a policy engine 136 that validates the access token in the authenticated request against a set of policies, P1 . . . Pn, stored in a policy repository 140. The target service 102A also includes token keys 138 used to decode the access token in the request.

It should be noted that FIG. 1 shows components of the system in one aspect of an environment in which various aspects of the invention may be practiced. However, the exact configuration of the components and dataflow shown in FIG. 1 may not be required to practice the various aspects and variations in the configuration shown in FIG. 1 and the type of components may be made without departing from the spirit or scope of the invention. For example, the disclosure is not limited to the authentication flow shown in FIG. 1 and other authentication flows may utilize the techniques described herein such as without limitation OAuth 2.0 device authorization grant flow, OAuth 2.0 client credential flow, OAuth2.0 resource owner password credentials grant, and OAuth2.0 SAML bearer assertion flow, and the like.

Figure 2:
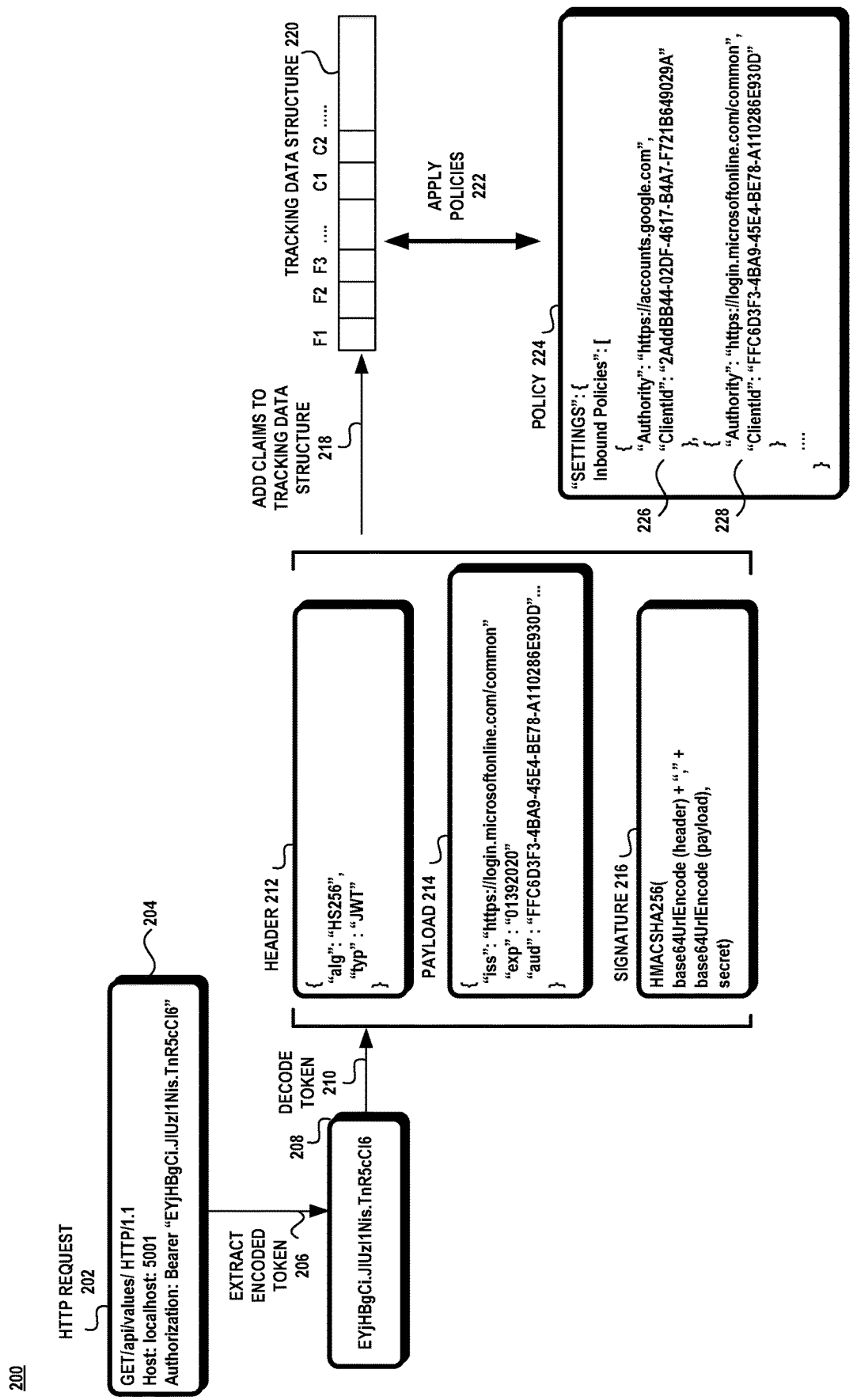
FIG. 2 is a schematic diagram illustrating a process and components used in the validation of a security token.

FIG. 2 illustrates an exemplary token validation process 200. The token validation process 200 attempts to eliminate redundant processing by tracking the functions that have been performed successfully. There are several functions that are common in the validation of a security token regardless of the type of token, the format of the transmission package that includes the token, and/or the authentication/authorization protocol used to generate the security token. Certain functions are computationally expensive, such as decoding the token, reading the token and checking the signature of the token. As each policy is applied to a token, the functions that have been successfully applied are tracked in a tracking data structure. In this way, the computationally expensive functions are performed once regardless of which policy performed the function.

Referring to FIG. 2, an HTTP request 202 received at a client service contains a request method, a URI, a request header 204, and a request body. The HTTP request 202 includes a GET method to obtain api/values using HTTP version 1.1. The Authorization tag in the header 204 includes a bearer token 204. In this example, the bearer token is a JavaScript Object Notation (JSON) Web Token (JWT).

A JWT contains claims that are used to identify the granted permissions to a web API. The access tokens are digitally signed and are used to provide access to APIs and resource servers. When an endpoint receives an access token, it must validate the signature to prove that the token is authentic. The claims validated by the policy engine vary but there may be common claim validations in each scenario.

A JWT is a self-contained and secure JSON object that is digitally signed. The JWT 204 is a string of encoded characters that was digitally signed using one of a number of algorithms such as a secret with a Hash-based Message Authentication Code (HMAC) function or signed using a public/private key pair using Rivest-Shamir-Adelman (RSA) or Elliptic Curve Digital Signature Algorithm (ECDSA).

The JWT is extracted from the HTTP request 206 and decoded 210 into three portions: a header portion 212; a payload portion 214; and a signature portion 216. The portions are separated by periods in the encoded character string. The JWT is decoded using the default encoding of the operating system of the target service or a Base64URL decoder.

The header portion 212 indicates the technique used to digitally sign the token ("alg": "HS256") and the type of token ("typ": "JWT"). The payload portion 214 contains verifiable statements of the requestor, such as the identity of the requestor and the permissions that are allowed. The claims are represented as attribute-value pairs. The most common claims include the following: "iss" is the issuing entity which is the authentication server; "iat" is the timestamp of the creation of the token; "sub" is the technical identifier of the user; and "exp" is the token expiration timestamp.

The signature portion 216 is a hash of the header, payload, and a secret key. The signature must be verified before storing the JWT and using the JWT. The secret key is held by the target service.

The identity provider digitally signs the JWT using a cryptographic operation that generates a signature that the policy engine can validate to ensure that the token has not been tampered with. The RSA256 algorithm uses a public/private key pair. The identity provider uses a private key to generate the signature and the policy engine gets a public key to validate the signature. Often the identity providers make the public key available through a metadata endpoint whose URL that may be included in the request. The HS256 algorithm uses a single secret key to generate the signature that is shared between the identity provider and the target service. The secret key is exchanged out-of-band of the HTTP request through a secure communication channel.

A policy may be implemented as a JSON file 224 that includes multiple inbound policies and outbound policies. An inbound policy is applied to requests received at an endpoint and the outbound polices are applied to the responses. In this example, there are two inbound policies. The first inbound policy 226 includes the attributes "Authority" and "ClientId" with respective values. The "Authority" attribute indicates that the iss claim in the token should have the value "https://accounts.google.com." The "ClientId" attribute indicates that the aud claim in the token should have the value "2AddBB44-02DF-4617-B4A7-F721B649029A." The second inbound policy 228 includes the attributes "Authority" and "ClientId" with respective values.

A policy may include other attribute-value pairs. The value for an "Audience" attribute represents the intended recipient of the incoming token or the resource that the token grants access to. If the value specified in the "Audience" parameter of the policy does not match the aud claim in the token, the token will be rejected because it was meant to be used for accessing a different resource. The value for an "Authority" attribute is the address of the token-issuing authentication server or identity provider. The policy engine will use this URI to find and retrieve the public key that can be used to validate the token's signature. It will also confirm that the iss claim in the token matches this URI.

Once the token's signature has been validated, the claims in the payload 214 are added 218 to the tracking data structure 220. The tracking data structure 220 is used to keep track of the functions (F1, F2, F3, . . . ) and claims (C1, C2, C3) that have already been processed. Functions are the steps performed to validate the token. For example, function F1 may be the extraction of the token from the HTTP request 206, function F2 may the decoding of the token 210, and F3 may be the function of checking the signature. The claims are those that are in the payload of the token. After each claim is verified by a policy, the claim is deleted from the tracking data structure 220. In this way, the policy engine does not have to search all the claims for a particular claim that is needed by a policy. Instead, the remaining claims that have not been used by a policy are left in the tracking data structure 220.

The policy engine starts with a first policy and applies each rule within the policy until the policy fails or succeeds. When a policy fails, the next policy is applied and the work performed by the previous policy is tracked in the tracking data structure 220.

Figure 3:
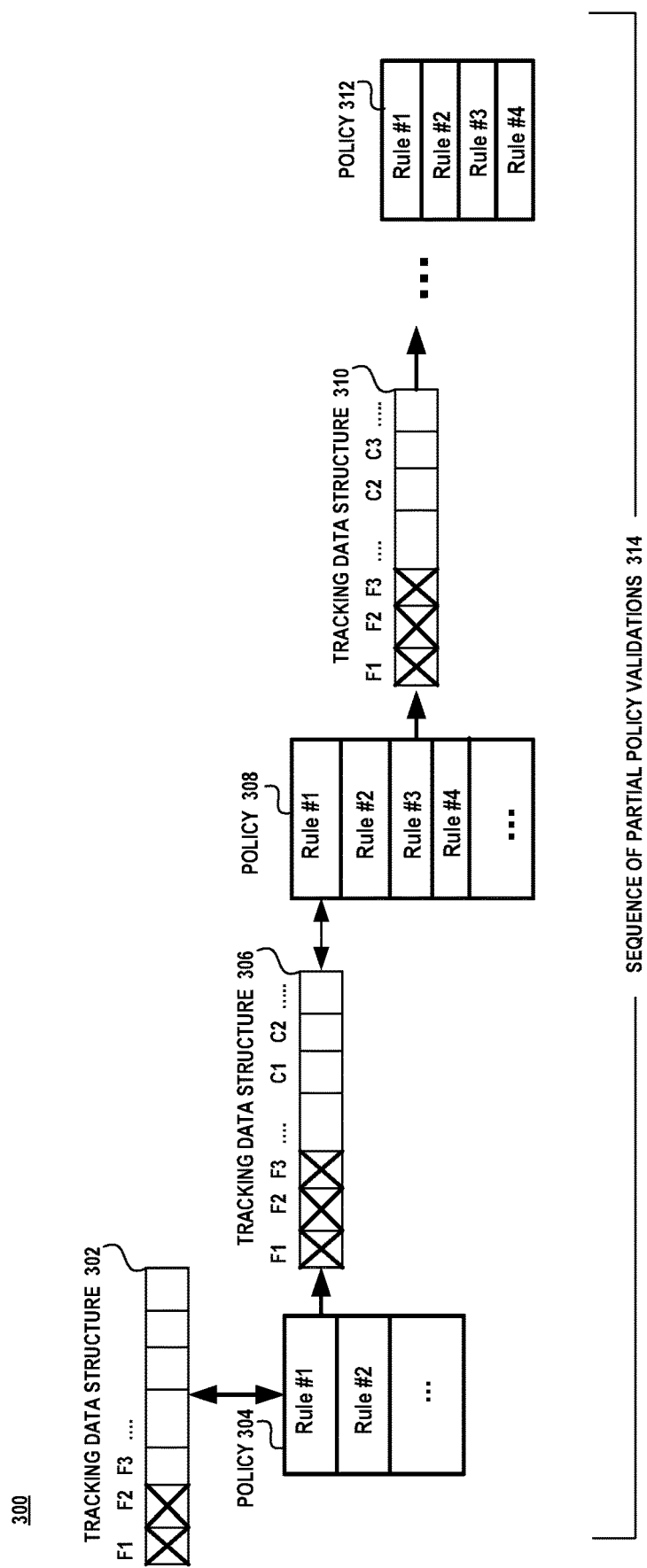
FIG. 3 is a schematic illustrating an exemplary sequence of partial policy validations.

Turning to FIG. 3, there is shown an illustration of an exemplary token verification 300 using a sequence of partial policy validations. In this example, tracking data structure 302 includes a list of functions (F1, F2, F3, . . . ) and claims (C1, C2, . . . ) where F1 represents receiving an HTTP message and extracting out the first token, and F2 represents decoding the token. The tracking data structure 302 indicates that the functions F1 and F2 have already been performed.

At this point, the policy engine reads the token header to find the hashing scheme used to digitally sign the token. In this example, it is HS256 since the token header has the claim "alg": HS256. Since F1 and F2 have been performed, they are marked in the tracking data structure 302 as completed. The policy engine finds a policy that performs the hashing algorithm which is policy 304. The policy engine applies rule #1 of policy 304 which checks the signature of the token. Upon successful completion of the signature check, the tracking data structure 306 is marked for completing function F3. The claims in the payload (C1, C2) are then inserted into the tracking data structure 306.

The next rule, rule #2, in policy 304 is to check if the audience claim is a certain value. Rule #2 of policy 304 fails and the policy engine proceeds to policy 306. The first two rules of policy 308 have been performed by policy 304 so the policy engine proceeds to rule #3 of policy 308 which tests if the audience claim meets the value of policy 306. Rule #3 of policy 306 succeeds so the field representing C1 in the tracking data structure 310 is deleted thereby indicating that claim C1 has been processed. The policy engine proceeds to the next rule in policy 308 until a rule fails. At that point, the policy engine proceeds to the next rule. The policy engine moves to policy 312. The first three rules in policy 312 have already been completed in the application of the previous policies so the policy engine starts with rule #4. Rule #4 checks claim C2 which is the "exp" claim. Rule #4 requires that the token has not expired. When rule #4 succeeds, policy 312 is completed and the token is validated. As shown in FIG. 3, the token is validated through the sequence of partial policy validations 314 which includes policies 304, 308, and 312.

Methods.

Attention now turns to a description of the various exemplary methods that utilize the system and devices disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 4:
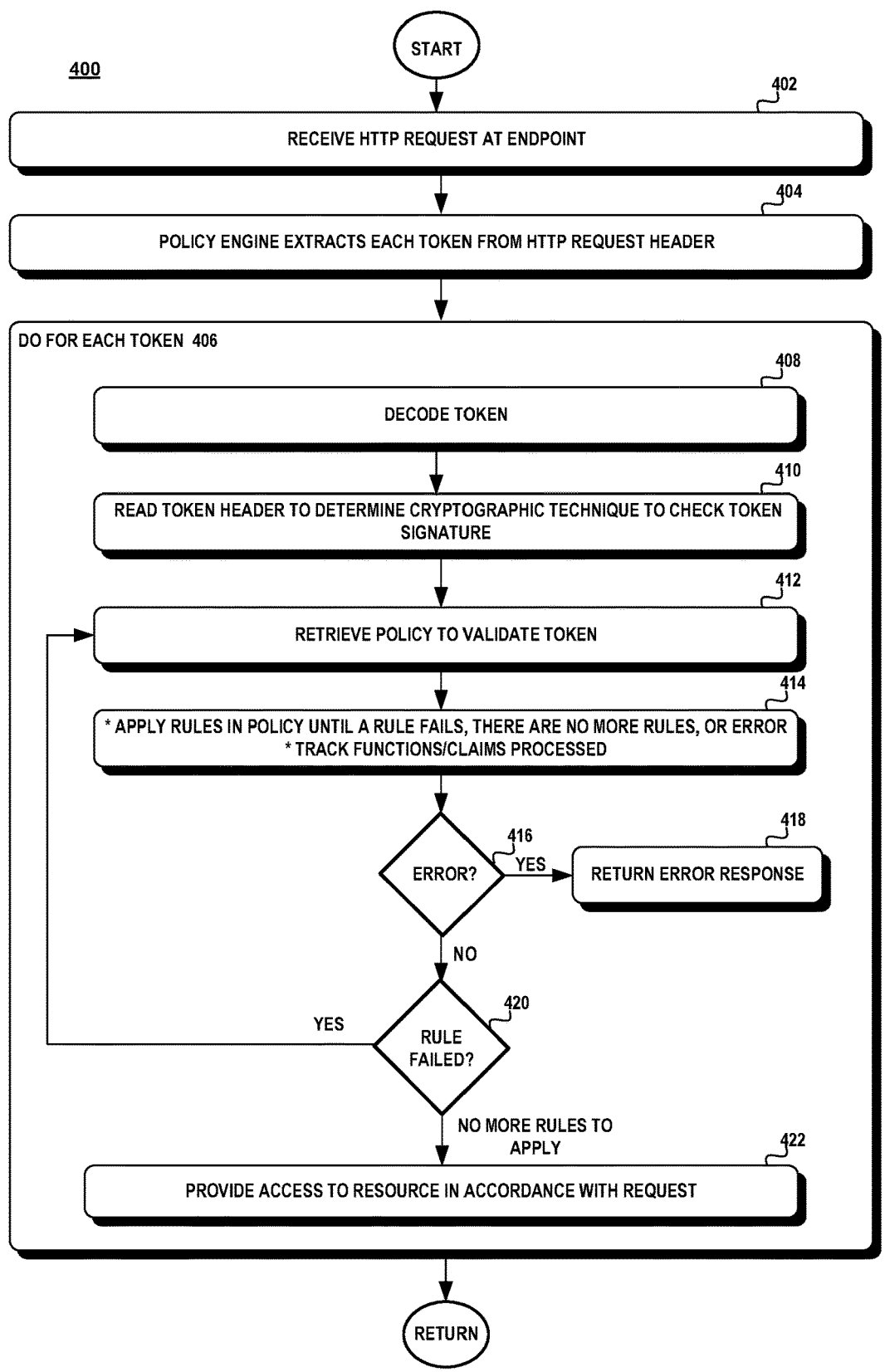
FIG. 4 is a flow diagram illustrating an exemplary method for validating a security token in an authenticated request.

FIG. 4 illustrates an exemplary method 400 for validating a security token using partial policy validation. Referring to FIGS. 1 and 4, a target cloud service 102A receives at an endpoint 134 an HTTP request 124 to access a secured resource hosted at the target cloud service 102A (block 402). The HTTP request 124 represents an authentication request where the identity of the requestor has already been authenticated by an identity provider 104. The authenticated request 124 includes one or more security tokens where a security token is issued by a specific identity provider 104. Each security token may have been issued by a different identity provider 104.

The policy engine 136 checks if the token is well-formed and extracts each portion out of the token. In the case of a JWT, the policy engine 136 verifies that there are three portions with each portion separated by periods. The policy engine 136 parses the JWT to extract its components. The first portion is the header, the second portion is the payload and the third portion is the signature. (Collectively, block 404).

Each portion is Base64URL encoded. The policy engine 136 uses a Base64URL algorithm to decode the header, the payload and the signature to verify that each portion is a valid JSON object. (Collectively, block 408).

The policy engine 136 reads the token header to determine the cryptographic technique that was used to digitally sign the token. The "alg" attribute of the decoded header indicates the signing algorithm. The policy engine 136 checks that the token was correctly signed using the proper key and signing algorithm. The policy engine obtains the secret or the public key from the token key storage. (Collectively, 410).

The policy engine 136 finds a policy in the policy repository 140 having a rule that requires the token to be signed with the signing algorithm identified in the token header (block 412).

The policy engine 136 applies the rule in the current policy to the token by checking the signature of the token using the same technique (block 414). If the signature check fails, then the token is rejected and an error response is returned to the middle-tier service 102B (block 416—yes, 418).

Each rule in the current policy is applied until a rule fails, all rules in the policy have been applied successfully, or an error occurs. When the current rule of the policy succeeds, then the next rule of the policy is applied to the token. When the current rule fails, the policy engine proceeds to the next policy. The tracking data structure is updated to reflect successfully completed functions and to delete claims that have been processed. (Collectively, block 414).

A rule fails when the token does not adhere to a requirement indicated in the rule. For example, a rule may specify that the "aud" claim needs to contain a particular value. When the "aud" claim in the token contains another value, then the rule fails and another policy is selected.

When there are no more rules to apply in the current policy, then the token is validated (block 420—no). The policy engine facilitates access of the requested resource to the client application as indicated in the request (block 422) and the next token is processed (block 406) until all tokens have been validated.

Exemplary Operating Environment

Figure 5:
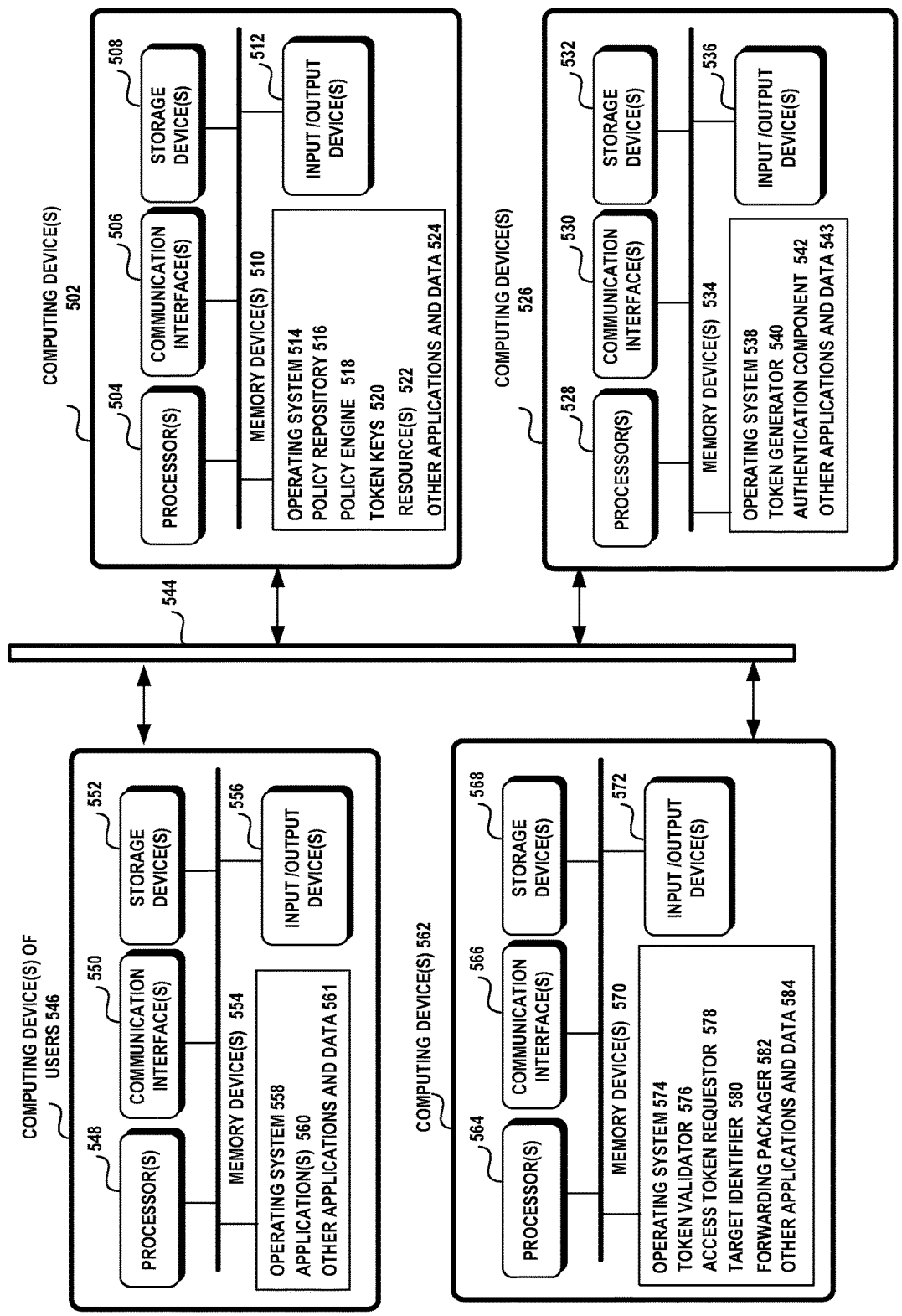
FIG. 5 is a block diagram illustrating an exemplary operating environment.

Attention now turns to a discussion of an exemplary operating environment. FIG. 5 illustrates an exemplary operating environment 500. The operating environment 500 may be a cloud-based computing environment having multiple computing devices 502, 526, 562 coupled to one or more computing devices of a user 546 through a global network 544.

A computing device 502, 526, 546, 562 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, an Internet-of-Things (IOT) device, a distributed computing system, multiprocessor systems, or combination thereof. The operating environment 500 may be configured in a network environment, a distributed environment, a multi-processor environment, or a stand-alone computing device having access to remote or local storage devices.

A computing device 502, 526, 546, 562 may include one or more processors 504, 528, 548, 564, one or more communication interfaces 506, 530, 550, 566, one or more storage devices 508, 532, 552, 568, one or more input/output devices 512, 536, 556, 572 and one or more memory devices 510, 534, 554, 570. A processor 504, 528, 548, 564 may be any commercially available or customized processor and may include dual microprocessors and multi-processor architectures. A communication interface 506, 530, 550, 566 facilitates wired or wireless communications between the computing devices and other devices.

A storage device 508, 532, 552, 568 may be computer-readable medium that does not contain propagating signals, such as modulated data signals transmitted through a carrier wave. Examples of a storage device 508, 532, 552, 568 may include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices in a computing device. The input/output devices 512, 536, 556, 572 may include a keyboard, mouse, pen, voice input device, touch input device, display, speakers, printers, etc., and any combination thereof.

A memory device 510, 534, 554, 570 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 510, 534, 554, 570 may also include one or more external storage devices or remotely located storage devices that do not pertain to propagated signals, such as modulated data signals transmitted through a carrier wave.

Memory device 510 includes an operating system 514, a policy repository 516, a policy engine 518, token keys 520, resources 522, and other applications and data 524. Memory device 534 includes an operating system 538, a token generator 540, an authentication component 542, and other applications and data 543. Memory device 554 includes an operating system 558, applications 560, and other applications and data 561. Memory device 570 includes an operating system 574, a token validator 576, an access token requestor 578, a target identifier 580, a forwarding packager 582, and other applications and data 584.

Network 544 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

Network 544 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Technical Effect

Aspects of the subject matter disclosed herein pertain to the technical problem of validating a security token in an authenticated request by using a sequence of partial validations of multiple policies. The security token represents a level of trust. The validation is performed to ensure that the security token has not been altered or tamped with during transmission, that the request is coming from a particular authentication server (e.g. identity provider), and is intended for the target web service. The technical features associated with addressing this problem involves tracking the work product performed at each stage of the validation from the different policies that were applied to the token, including failed policies that partially validated a portion of the security token. In this manner, the resource-consuming steps performed in a token validation process are performed once and shared by the later-applied policies in the sequence.

CONCLUSION

A system is disclosed having one or more processors coupled to a memory and having one or more programs. The one or more programs are stored in the memory and configured to be executed by the one or more processors. The one or more programs include instructions that: receive an authenticated request to access a resource of a web service, the authenticated request including a security token, the resource associated with a plurality of policies, a policy having a plurality of rules that when satisfied validate the security token, the security token generated by an identity provide having authenticated an entity (e.g., user or application) seeking access to the resource, a policy associated with a distinct identity provider; select a first policy of the plurality of policies associated with the resource; apply one or more rules of the first policy to validate the security token; and upon failure of at least one of the one or more rules of the first policy, utilize one or more additional policies associated with the resource to validate remaining segments of the security token when a rule of a succeeding policy fails, wherein each additional policy utilizes data processed by a preceding policy.

The system includes further instructions that validate a second security token in the authentication request using a second sequence of partial policy validations. The system may also include further instructions that validate the first security token in the authentication request through successful completion of all rules of a single policy. Upon failure of each policy, the system denies the application access to the resource. In one aspect, the security token is a JavaScript Object Notation (JSON) Web Token. A rule may indicate how to decode the security token and/or how to check a signature of the security token.

A method is described comprising: receiving, at a web service, a security token in an authenticated request, the security token representing trust of an application seeking access to a resource at the web service, the security token issued by a first identity provider; associating the resource with a plurality of policies, a policy associated with a distinct identity provider; and validating the security token through a sequence of partial policy validations, wherein each partial policy validation transmits work product generated in processing the security token in a preceding failed policy to a succeeding policy in the sequence.

In one aspect, the method may comprise further: selecting a first policy to validate the security token; applying at least one rule of the first policy to the security token; tracking work product generated in processing the at least one rule; and upon detecting that a second rule of the first policy fails, selecting a second policy to continue validation of the security token. The method may comprise further applying a rule of the second policy that has not been applied by the first policy; and upon successful application of remaining rules of the second policy, permit access to the resource. The method may comprise further upon failure of application of the rule of the second policy, select a third policy to continue validation of the security token.

In one aspect, the authenticated request is transmitted via a HyperText Transfer Protocol (HTTP) message. In one aspect, security token is a JavaScript Object Notation (JSON) Web Token (JWT). In one aspect, a rule indicates a technique to check a signature of the security token and/or indicates an issuer of the security token.

A device is disclosed comprising a processor coupled to a memory. The processor is configured to perform actions that: obtain an authenticated request at a web service, the authenticated request including at least one security token, the authenticated request associated with access to a resource at the web service; apply a sequence of policies to validate the at least one security token, a security token generated by a distinct identity provider, a policy including a plurality of rules that validate a security token, wherein the sequence of policies includes a first policy that failed to apply at least one rule to the security token and one or more succeeding policies that applied a rule to the security token, wherein work product performed by each rule of a policy in the sequence is transmitted to the one or more succeeding policies, and upon successful validation of the security token, permits access to the resource.

In one aspect, a rule indicates a technique to decode the security token, indicates a technique to check a signature of the security token, indicates an audience of the security token and/or indicates an issuer of the security token.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, the techniques described herein are not constrained to the use of attribute-value pairs to validate a rule of a policy. A line of a policy may include pluggable code that is executed to validate a particular rule. Additionally, the techniques described herein are applicable to multiple tokens contained in a request and any type of token contained in a request.

What is claimed:

1. A system comprising:
one or more processors coupled to a memory; and
one or more programs, wherein the one or more programs are stored in the memory and configured to be executed by the one or more processors, the one or more programs including instructions that perform actions to:
receive an authenticated request to access a resource of a web service, the authenticated request including a security token, the resource associated with a plurality of policies, a policy having a plurality of rules that when satisfied validate the security token for access to the resource, the security token generated by an identity provider having authenticated an entity seeking access to the resource, a policy associated with a distinct identity provider;
select a first policy of the plurality of policies associated with the resource;
apply one or more rules of the first policy to validate the security token; and
upon failure of at least one of the one or more rules of the first policy, utilize one or more additional policies associated with the resource to validate remaining segments of the security token when a rule of a succeeding policy fails, wherein each additional policy utilizes data processed by a preceding policy to validate the security token.

2. The system of claim 1, wherein the one or more programs include further instructions that performs actions to: validate a second security token in the authenticated request using a second sequence of partial policy validations.

3. The system of claim 1, wherein the one or more programs include further instructions that perform actions to: validate the security token in the authentication request through successful completion of all rules of a single policy.

4. The system of claim 1, wherein the one or more programs include further instructions that perform actions to: upon failure of each policy, deny the application access to the resource.

5. The system of claim 1, wherein the security token is a JavaScript Object Notation (JSON) Web Token.

6. The system of claim 1, wherein a rule of the plurality of rules indicates how to decode the security token.

7. The system of claim 1, wherein a rule of the plurality of rules indicates how to check a signature of the security token.

8. A method, comprising:
receiving, at a web service having a processor and a memory, a security token in an authenticated request, the security token representing trust of an application seeking access to a resource at the web service, the security token issued by a first authentication server;
associating, at the web service, the resource with a plurality of policies, a policy associated with a distinct authentication server; and
validating, at the web service, the security token for access to the resource through a sequence of partial policy validations, wherein each partial policy validation transmits work product generated in processing the security token in a preceding failed policy to a succeeding policy in the sequence.

9. The method of claim 8, further comprising:
selecting a first policy to validate the security token;
applying at least one rule of the first policy to the security token;
tracking work product generated in processing the at least one rule; and
upon detecting that a second rule of the first policy fails, selecting a second policy to continue validation of the security token.

10. The method of claim 9, further comprising:
applying a rule of the second policy that has not been applied by the first policy;
upon successful application of remaining rules of the second policy, permit access to the resource.

11. The method of claim 10, further comprising:
upon failure of application of the rule of the second policy, select a third policy to continue validation of the security token.

12. The method of claim 8, wherein the authenticated request is transmitted via a HyperText Transfer Protocol (HTTP) message.

13. The method of claim 8, wherein the security token is a JavaScript Object Notation (JSON) Web Token (JWT).

14. The method of claim 9, wherein the at least one rule of the first policy indicates a technique to check a signature of the security token.

15. The method of claim 9, wherein the at least one rule of the first policy indicates an issuer of the security token.

16. A device, comprising:
a processor coupled to a memory;
wherein the processor is configured to perform actions that:
obtain an authenticated request at a web service, the authenticated request including at least one security token, the authenticated request associated with access to a resource at the web service;
apply a sequence of policies to validate the at least one security token, a security token generated by a distinct identity provider, a policy including a plurality of rules that validate a security token for access to the resource, wherein the sequence of policies includes a first policy that failed to apply at least one rule to the security token and one or more succeeding policies that applied a rule to the security token, wherein work product performed by each rule of each policy in the sequence is transmitted to the one or more succeeding policies; and
upon successful validation of the security token, permit access to the resource.

17. The device of claim 16, wherein a rule of the plurality of rules indicates a technique to decode the security token.

18. The device of claim 16, wherein a rule of the plurality of rules indicates a technique to check a signature of the security token.

19. The device of claim 16, wherein a rule of the plurality of rules indicates an audience of the security token.

20. The device of claim 16, wherein a rule of the plurality of rules indicates an issuer of the security token.

* * * * *